3,552,978
METHOD FOR IMPROVING THE QUALITY OF MEAT-CONTAINING FOODS
Petrus Adam Inklaar, Diepenveen, Netherlands, assignor to Vasco Industries Corp., New York, N.Y., a corporation of New York
No Drawing. Filed Feb. 14, 1966, Ser. No. 527,063
Claims priority, application Netherlands, Feb. 15, 1965, 6501845
Int. Cl. A23b *1/03, 1/12, 3/10*
U.S. Cl. 99—107            19 Claims

ABSTRACT OF THE DISCLOSURE

Meat-containing foods such as fresh cut meat, sausage, etc. are given improved qualities of moisture retention, color retention, texture and taste by contacting the animal meat content with monobasic amino acids and/or salts thereof, e.g., histidine, cysteine, glycine, lysine, or protein hydrolysis products containing such amino acids, in the form of dissolved or finely divided solid compositions thereof having a pH between 6 and 12 and an acid buffering capacity in aqueous solution. The amino acid substance may be mixed with non-toxic alkaline or acidic material giving it the required pH value, and/or with meat curing salts or compounds which sequester calcium ions. Solutions of the compositions are injected or soaked into cut meat; powders of them are rubbed on cut meat surfaces or mixed into sausage stuffings.

---

The invention relates to novel additives and methods for improving the quality of meat-containing foods or nutrients.

It is known to add certain inorganic phosphorus-containing compounds, especially polyphosphates, to meat and meat products in order to improve their structure and juice retention, especially when heated.

For example, hams are injected with aqueous solutions of table salt and sodium polyphosphate, which not only cause an improved color but also a better juice retention. By this injection the water with the meat proteins and aromatics dissolved therein and the meat juices are better retained during the subsequent processing, such as cooking and/or smoking. Inorganic phosphorus containing substances are also used in sausage manufacture.

Quite apart from the fact that inorganic phosphorus compounds so used bring quantities of phosphorus into a growing number of foods, taste defects and other imperfections occur and sometimes crystals are formed in the foods. Corrosion of metal containers by hydrolysis of polyphosphates and in some cases the difficulty of dissolving these phosphates in the brine and keeping them dissolved are further reasons why needs exist for improved additives capable of giving effects similar to those obtained by the addition of polyphosphates.

In addition to being used as an injection liquid for hams and as a cutter auxiliary in sausage stuffings, the above-mentioned additives are also used in brine baths, in the preparation of cream cheese and in the preservation of fish and vegetables. In almost all cases the value of the additive is determined by the increased juice retention effected by the addition in question. A yardstick often used for judging various additives is their application as an injection liquid in hams, in which the juice retention is measured by comparing the increase of weight caused by the injection and any wet brining, on the one hand, the decrease in weight caused by pasteurising or sterilizing, smoking and the like on the other hand, this decrease being expressed as a percentage of the said increase in weight (so that the quantity of cut-out bones, bacon rind and the like does not influence the comparison). This type of measurement is, however, not very constant and necessitates the use of a large number of hams to secure reliable evaluations. Testing is also required as to the jelly-formation in canned hams, which is undesirable and often limited by regulations requiring the jelly weight to be kept below a certain maximum value. Evaluating this jelly-formation also requires a large number of expensive tests, combined with different storing periods under standard conditions. A method developed by the applicant and referred to hereinafter is much easier to carry out and leads to fully comparable results which conform to those realized in practice.

It is an object of the invention to provide a group of additives, especially for application to animal meat containing human or animal food, which additives improve the quality of the food and can be applied in any known way such as injection into the veins of the meat, by multi-needle injection, by addition to brines for contacting meat and meat products, by addition to sausage mixtures, by being rubbed into the surface of the meat, and in any other way of contacting said additives with food products.

More specifically the object of the invention is to provide a group of additives which can also be used in aqueous solutions at pH values below 8 or even 7, or even below 6.5, with a surprising result. Even more specifically the object of the invention is to provide aqueous additive solutions which diffuse more rapidly into raw meat, even when applied by a poor distribution method such as injection through the vein (aorta), than any additive solution heretofore used.

It is a further object of the invention to provide additives for improving the quality, especially the moisture retaining properties, of animal meat containing nutrients or foods, which additives show a good solubility in water and brine, dissolve rapidly in the useful concentration range and do not give rise to chemical attack of meat cans or other metal containers.

According to the present invention it has been found that excellent results can be obtained, with achievement of the objects stated above, by contacting meat containing nutrients with additives comprising certain monobasic amino acids and having hydrogen ion concentrations of at most about $10^{-6}$. While the L-form as well as the D-form or racemic mixtures of such amino acids may be used, preferably $\alpha$-amino acids are used which, as known, occur in nature in a great variety, some in a free condition but chiefly as building blocks of animal and vegetable proteins.

Preferably one uses for human foods those amino acids which occur as such or which are derived from animal or vegetable protein. Pure amino acids including synthetically prepared ones as well as amino acid mixtures show excellent results. Suitable mixtures are also obtained by hydrolysis of natural proteins, such as gelatin, casein, fibrin, serum albumin, hemoglobin, zein, keratin, either with acid such as hydrochloric acid or phosphoric acid or by enzymatic conversion with proteolytic ferments (pepsin, trypain, papain, pancreas extract), or by alkaline hydrolysis, by which it is possible to obtain directly a mixture of amino acid salts.

The amino acids to be added according to the invention may advantageously be produced in a finely divided solid form and if desired mixed with their salts and be adapted for various applications. If the raw meat surface is rubbed with the finely divided solid amino acid either as such or in mixtures and one or more other substances, such as table salt, spices and/or aromatics, and if holes are made with a fork or the like in order to assist the penetration of the preparation, a tenderizing effect is noticed which may be still increased and/or accelerated by moistening the surface of the meat with water, e.g., by sprinkling, brushing or the like, beforehand or after the preparation has been rubbed-in.

When the additive is to be applied in a dry form it is advantageous to prepare a powder with small-size particles. This ensures a better and quicker effect when the powder is used, e.g., as a cutter-auxiliary. Moreover, the solution rate in aqueous liquids is increased. Particle sizes of the order of 100 microns and smaller may be advantageously used.

Amino acids and mixtures of amino acids with their salts have, moreover, the advantage that they dissolve promptly in brine and do not precipitate or leave a residue, in contrast to the known phosphorus containing additives. Furthermore they are not corrosive to the usual tinplate packing and no special precautions have to be taken, such as a special coat of varnish, for preventing the tins in which hams are packed from becoming black and unsightly.

As amino acids, those having a high solubility in an alkaline medium are preferably chosen. Although amino acids having the amino group at a greater distance from the carboxylic group also show a positive action, such as $\beta$- or $\gamma$-amino acids, the $\alpha$-amino acids have the great advantage that toxic side effects can be ruled out.

In the preparation of sausages the additives according to the invention have the result that firm, homogeneous sausages which keep the meat protein, fat and water well bound, may be obtained if the additive is added in the cutter, preferably in quantities of 0.3%–1% of dry additive, calculated on the total stuffing.

Especially when large quantities of amino acids are added, it is of advantage to add also to the meat one or more buffering substances which can form complexes with the calcium and/or magnesium present in the meat product, such as alkali citrate, tartrate, lactate or nitrilotriacetic acid, ethylene diaminotetraacetic acid salts, or polyphosphates. Some amino acids, especially glycine, will themselves form complex compounds with Ca- and Mg-ions. Here too the addition of the abovementioned substances still shows an improvement.

Also any other additives, known in themselves, may be added to the mixture, such as ascorbic acid, ascorbic acid salts, nitrates, nitrites and the like.

The salts of the amino acids may be potassium-, sodium- or ammonium-salts. Also alkaline earth salts or compounds derived from other substances may be used, provided they bring or maintain the pH in a 1% aqueous solution of the mixture to at least a value of about 6.

It is not absolutely necessary to prepare the salts beforehand. They may be formed in situ when the additive is dissolved. As a cutter auxiliary to salts or mixtures of salts and free amino acids will preferably be the starting materials.

Salts of strong bases and weak mono- or polybasic acids may be used to this end, such as sodium carbonate, sodium perborate and disodium phosphate. Also mutual mixtures of the above-mentioned substances or mixtures of them with alkali hydroxides can be used. A favorable effect was also obtained with calcium- and magnesium salts of the amino acids, though to a lesser degree than with the alkali salts.

Acid, neutral as well as basic amino acids and their alkaline or acid (HCl among others) salts may be used. Alkali as well as alkaline earth salts may be used. The action is, with pH's above 10 and even above 12, still excellent, provided that a good distribution in the meat containing product is possible, such as with multi-needle injection of hams, as otherwise an accelerated deterioration of the food may occur. Further it surprisingly appeared that amino acid containing mixtures having a pH between about 8 and 10 noticeably improved the color of meat treated with salt solutions. With very high pH's technological objections appeared in practice so that a limit of 10 is preferably not surpassed.

Instead of the free amino acid mixed with an alkaline substance, such as alkali hydroxide, alkali carbonate or an alkali salt of another weak acid, the amino acid salt my advantageously be used which may then, to obtain the desired pH, be mixed either with free amino acid or with another acid or alkaline component.

Still other advantages will occur in meat products besides an improved juice retention, as compared with the usual additions, in that the increased contents of free amino acid will improve the aroma and food value of the meat when it is cooked or fried, especially when using amino acids which are beneficial for human consumption.

The additives according to the invention may be applied at room temperature as well as at a lower temperature down to 0° or lower. If so desired one can also work with higher temperatures, as the amino acids, as known, are very stable with regard to increases of temperature. These additives can be applied unobjectionably under either a decreased or an increased pressure. They are especially well suited for the "multi-needle" injection of ham, the more so as their easy solubility in brine solutions avoids any risk of clogging the needles.

If the amino acid itself has a high pH this pH can be decreased to a desired value by adding acid components. Besides acetic acid, salts showing an acid reaction, organic acids and acid salts are also suitable for this purpose. Examples are: monosodium phosphate, sodium bisulphate, citric acid, lactic acid, tartaric acid and boric acid. As salts showing an acid reaction compounds such as e.g. the mono acetic acid salts of lysine can be used.

The amino acid compositions used according to the invention are of special importance for the treatment of meat and meat products such as hams, sausages and others.

For this treatment a buffering action of the compositions in the region pH 5.5–5.8 is highly desirable especially with less uniform distribution methods. So one may inject a ham with a hypodermic syringe into the arteries, which is a rather local treatment, or with a multi-needle system into the bulk meat, which gives a far more uniform distribution. In the first case a very good buffering action in the lower pH range, say between 5.5 and 7.5, is desirable to obtain a good result as otherwise many local jelly spots may be formed which would make the meat less desirable for consumption. A more uniform distribution makes the result less dependent on buffering capacity, but still gives a better quality end product the better the buffering liquid used for the injection. A buffering action below pH 5.5 is evidently of no importance. In general it is desirable to apply a liquid having as low a pH as will be effectual, in order to avoid local disturbances in the meat product or bacterial decay as a result of too high a pH occurring at spots in the meat.

Glycine, lysine and many other monobasic amino acids give favourable buffering composition when the pH is brought above 6 by adding either an alkali, or an acid to an amino acid having too high a pH, as the case may be. A dibasic amino acid such as glutamic acid has no buffering action whatsoever in the required pH range and so it is of no practical value for the purpose of the invention. By dibasic acids are meant acids which contain two carboxyl groups either as such or substituted by positive ions or $NH_2$—groups.

Preferably the buffering should be in the pH region between 5.5 and 8 and in this respect histidine is an outstanding component in the compositions according to the invention.

The lower limit of the amounts of additives to be applied by injection of an aqueous solution depends on the desired extent of their effect. Normally at least 0.05% of amino acid based on the weight of the nutrient should be added. If one uses dry mixtures to spread over the surface of meat no critical lower limit can be given as it depends on the kind of treated product, its surface, temperature, moisture content at the surface, and other variables.

The higher limit is in most cases a matter of taste. Many amino acids have a special and sometimes pronounced taste if added in too large amounts. With glycine one observes a sweet taste which can become unpleasant if glycine is added in a quantity of more than some 0.75% based on ham weight. Other amino acids may be used in higher or lower amounts but in general one will not exceed 2% based on the weight of the treated product. When the amino acid composition is applied by contacting the product with an aqueous solution which may then also contain other components such as sodium chloride, nitrite, nitrate, carbohydrates, or other known chemicals, 0.5–10% solutions of the monobasic amino acid may be used.

Monobasic amino acids in the sense of the invention are amino acids which contain only one non-substituted carboxyl group.

One may also apply mixtures of amino acids. These mixtures can be obtained by hydrolysis of vegetable or animal proteins but also by mixing the more or less pure components. Some of these mixtures show a kind of synergistic effect. The tatse deviations caused by adding glycine or lysine as such disappear even when 50% or more of a 1:1 mixture of these amino acids is added.

Some monocarboxylic amino acids such as histidine show a taste effect only when added in a very large amount such as 5% or more. A sweet taste can in many cases become an advantage by enabling the use of less sugar in sugar cured meat or meat products.

Apart from improving the tenderness and juice retention of meat or other products the monobasic amino acids improve the flavor development with cooking, frying, smoking or other heat treatment of the product. The reason for this is not clear but it may be due in part to the improved moisture retention or to a reaction between meat components and the amino acid. The loss of natural mineral salts and of added spices of the meat product is negligible as compared with the same product to which no amino acids are added.

It is clear the amino acids should be such that no toxicity occurs or develops. In this respect the amino acids to be used occurring in the free state or as building blocks of animal proteins are preferable. One can even supply the human or animal body with essential amino acids by using these acids as a component of the additive.

By way of example one may mention the following amino acids: α-alanine, arginine, cysteine, glycine, histidine, δ-hydroxylysine, hydroxypyroline, leucine, iso-leucine, lysine, methionine, monoidotyrosine, norleucine, phenylalanine, proline, serine, threonine, thyroxine, tryptophan, tyrosine, valine, β-alanine, α-amino-n-butyric acid, γ-amino-n-butyric acid, β-amino isobutyric acid, δ-amino-levulic acid, citrulline, creatine, creatinine, ergothioneine (betaine of thiolhistidine), glycocyamine, homoserin, ornithine, taurine and others known to the art. Those amino acids which easily dissolve in water are to be preferred.

One may also use any mixture of the above amino acids consisting of 2, 3, 4 or more, even 10 or 20 components.

Natural mixtures of amino acids which may also contain peptides are obtained by hydrolysis of proteins. Beside peptides and amino acids such mixtures may still contain undecomposed protein. To the extent that the mixture goes into solution in water or an alkaline medium a favorable effect is obtained by the use of such mixtures according to the invention. Solutions of such protein hydrolysis products may also be dried in any known way, such as by drum drying, spray drying, freeze drying, or thin layer drying, in order to obtain a solid powder. One may also obtains a dry product by adding a water miscible organic liquid, such as acetone, methanol, ethanol, isopropanol, to the aqueous hydrolysis solution, separating the precipitated solid material from the liquid and washing, if needed, with a pure organic volatile liquid of the above water miscible type such as acetone, methanol or ethanol. The solid product obtained by the above methods may be subdivided by any known means, such as for instance milling or grinding, to obtain the desired particle size.

The amino acids or mixtures thereof may be applied to the meat in admixture with salts conventionally used for treating meat or meat products such as sodium chloride, sodium nitrite, sodium nitrate, sodium tripolyphosphate, sodium pyrophosphate, orthophosphate, metaphosphate, hexametaphosphate, or any other polymer water soluble phosphate. Instead of the sodium salts one may use the potassium salts.

This invention is further illustrated by the following specific examples. It is to be understood that my invention is not to be restricted to the details of these examples.

EXAMPLE I

Determination of the waterbinding capacity (WBC) of meat

From 1 kg. of beef the fat is cut away as much as possible. The rest is twice minced through a mincer having a 4 mm. plate and is subsequently placed in a cold-storage space for 16 hours where the temperature is 1–4° C. Subsequently it is again minced with a 4 mm. plate.

Of this meat 100 g. is weighed out into a 1000 ml. beaker and 300 g. of water at 1–4° C. are added. Subsequently 8 g. of NaCl are added, giving a total sample weight of 408 grams.

The additive to be tested is now added whereupon the mixture is homogenized at 10,000 r.p.m. during 2 minutes.

Three centrifuge tubes are each filled with 100 g. of this homogenate and are placed for one hour in a water bath at 65° C. Subsequently they are placed for 5 minutes in water at 10–15° C. and thereupon centrifuged during 15 minutes at 2800 r.p.m. Water and meat are then separated from each other by pouring off the water. The centrifugal tube containing the meat with the bound water is now weighed as well as the poured-off water. If the weight of meat+bound water is represented by R and the dry substance of the additive to be tested by D, the WBC will be the following:

$$WBC = 0.01 \times R(408 + D) - (108 + D)$$

i.e. the quantity of water retained by 100 g. of meat. Each test is made in 12-fold in order to obtain reliable data.

In order to eliminate the effect of variation in the meat product the sample to be tested is always divided in two. To one part the chosen standard is added and to the other part the additive to be tested. As a standard $Na_4P_2O_7$ proved to be very effective. In this way a ratio number is found $$\frac{WBC \text{ tested additive}}{WBC \ Na_4P_2O_7} = P \pm Q \text{ percent}$$

If the WBC of untreated meat is compared with that of meat treated with $Na_4P_2O_7$, the following is found:

$$\frac{BC \text{ untreated sample}}{W \quad WBC \ (Na_4P_2O_7)} = 0.19 \pm 0.02$$

The pH of the beef was in this case 5.8. This is determined in the following way:

To 100 g. of meat 3000 cc. of water are added and the whole is mixed during 5 minutes in a Waring Blendor.

The pH is then determined with a glass calomel electrode.

The strong dilution is necessary to minimize the salt error as much as possible. This salt error is very large in meat products treated with phosphous compounds, causing a too low pH to be found in undiluted suspensions.

EXAMPLE II

A standard mixture is made, consisting of 47 wt. percent of lysine, 20.1 wt. percent of sodium lysinate and 32.9 wt. percent of table salt.

This preparation was added to lean beef and in the way described in Example I the ratio of waterbinding capacity was compared with $Na_4P_2O_7$, of which 2 g. to each 100 g. of meat was used. The result was the following.

| Added number of g. of lysine standard mixture: | WBC additive/ WBC $Na_4P_2O_7$ |
|---|---|
| 2.0 | 1.29±0.14 |
| 1.7 | 1.15±0.12 |
| 1.6 | 1.00±0.10 |
| 1.5 | 0.89±0.09 |

Addition of 50 g. of citric acid to 100 g. of lysine standard mixture caused the WBC quotient to rise about 0.2 unit, while addition of 1 g. of ethylenediaminetetra acetic acid to 1.6 g. of lysine standard mixture increased the WBC value from 1.00 to 1.15.

EXAMPLE III

To 100 g. of meat prepared as in Example I 300 ml. of water, 8 g. of NaCl and 2 g. of each of various amino acids was added.

There was always taken care, by adding either NaOH or HCl, that the pH was 9.6 in 1% aqueous solution. Comparison with the action of $Na_4P_2O_7$ showed that all the amino acids caused an increase of the water binding capacity as compared with meat without additions, although some amino acids, such as glycine, bound less liquid than sodium pyro-phosphate under the conditions of the test, i.e. at a pH in 1% solution of 9.6.

| Amino acid | WBC additive/ WBC $Na_4P_2O_7$ | WBC additive/ WBC $Na_4P_2O_7$ when using table salt |
|---|---|---|
| Glycine | 0.81 | 0.86 |
| Arginine | 1.11 | 1.09 |
| Cysteine | 1.30 | 1.21 |
| Lysine | 1.44 | 1.48 |

Within the experimental error the results with the potassium salts of the amino acids are identical with those of the sodium salts.

EXAMPLE IV

The influence of the added quantity of amino acid on the final result was determined by adding varying quantities of a standard mixture, consisting of 58% of Na-glycinate and 42% of NaCl and having a pH of 10.6 in a 1% aqueous solution, to meat and evaluating the result in the way described in Example I.

The result was the following.

| Added in g. per 1000 g. of lean beef: | Relative WBC in comparison with 2 g. of $Na_4P_2O_7/100$ g. of lean beef |
|---|---|
| 5.0 | 1.19±0.11 |
| 4.2 | 1.11±0.10 |
| 4.0 | 0.98±0.10 |
| 3.0 | 0.88±0.10 |

EXAMPLE V 14 hams were injected into the artery with a solution of a mixture of 35% of lysine, 35% of sodium lysinate, 20% of NaCl and 10% of Na-citrate 2 aq. in water in such a manner that per kg. of ham 5 g. of dry mixture was injected.

The dry mixture was dissolved in such a quantity of liquid that before deboning an amount of liquid of about 20% of the ham weight was injected. After the injection the hams were kept in the customary way in the preserving brine for 3 days. Subsequently bones and pork were removed, whereupon the ham was cooked, cooled and smoked. By determining the weight in each phase the percentage of injected liquid bound in the ham could be ascertained.

The result was the following:

| No. | Gross ham-weight, in g. | Net ham-weight before cooking, in g. | Ham-weight in g. after smoking and cooling down for 36 hours | Weight of injected liquid, in g. | Percent of the water which was bound |
|---|---|---|---|---|---|
| 25 | 4,830 | 4,760 | 4,250 | 1,120 | 52.8 |
| 26 | 5,270 | 4,930 | 4,350 | 990 | 37.6 |
| 27 | 5,000 | 4,830 | 4,250 | 1,050 | 42.6 |
| 28 | 5,000 | 4,850 | 4,350 | 1,020 | 49.2 |
| 29 | 5,140 | 5,050 | 4,450 | 1,160 | 45.7 |
| 30 | 5,380 | 5,185 | 4,649 | 1,100 | 48.7 |
| 31 | 4,940 | 4,700 | 4,200 | 1,090 | 49.8 |
| 33 | 5,190 | 5,200 | 4,613 | 1,120 | 45.1 |
| 34 | 5,180 | 4,950 | 4,250 | 950 | 23.1 |
| 35 | 5,110 | 5,060 | 4,650 | 1,100 | 61.7 |
| 36 | 5,250 | 5,185 | 4,500 | 1,130 | 36.3 |
| 37 | 5,340 | 5,200 | 4,680 | 1,160 | 52.1 |
| 38 | 5,130 | 4,890 | 4,300 | 1,080 | 42.7 |
| 39 | 5,230 | 5,230 | 4,683 | 1,150 | 50.1 |

The figures show clearly that a very strong increase of the liquid binding occurs. From this also appears the wide variation of the waterbinding capacity which must be especially ascribed to the kind of raw material. The hams in question had an excellent appearance, they were of a firm structure and the metal taste occurring sometimes in hams injected with a phosphate mixture was entirely lacking.

Similar results were obtained when the lysine was replaced by cysteine or tyrosine.

EXAMPLE VI

To 100 g. of beef in samples prepared as in Example I increasing quantities of the following mixtures were added.

| Mixture A: | Percent |
|---|---|
| Lysine-HCl | 12.8 |
| Lysine | 50.8 |
| Na-citrate 2 aq. | 15.9 |
| NaCl | 20.5 |
| Mixture B: | |
| Glycine | 34.4 |
| Sodium-glycinate | 65.6 |
| Mixture C: | |
| Glycine | 65.5 |
| Sodium-glycinate | 34.5 |

The waterbinding capacity was compared with that of an addition of 2 g. of tripolyphosphate per 100 g. of beef. It now appeared that the same effect as with tripolyphosphate was obtained when the following quantities were added:

| | G. |
|---|---|
| Mixture A | 2.0 |
| Mixture B | 1.4 |
| Mixture C | 2.2 |

A taste panel judged, however, the taste of the products prepared with the mixtures A, B and C always to have a better flavor than those prepared with polyphosphate.

EXAMPLE VII

Some thirty hams were injected in the manner described in Example V with 12–15% of an injection liquid, containing as dissolved dry matter 12.8% of lysine-HCl, 50.8% of lysine, 20.5% of NaCl and 15.9% of Na-citrate 2 aq.

After having been freed from bones, fat and the like in the usual way, the hams were canned and cooked. The canned ham was stored at a temperature of 20° C. and appeared, after having been in storage for 3 months, to be free of crystals. Not a single ham contained more than 7.5% of jelly. The interior of the can was absolutely undamaged and did not show signs of corrosion, notwithstanding the fact that the cans had not been varnished but had indeed been provided with a good tin coating. When injecting the same composition but with histidine instead of the lysine-HCl puls lysine (71.3% histidine) jelly formation remained below 3.8%.

EXAMPLE VIII

To the mixture A of Example VI, instead of 15.9% of Na-citrate 2 aq., a quantity of 10 g. of EDTA was added on 63.6 g. of lysine-lysine-HCl-mixture. In this case, 1.7 g. of mixture A appeared to give the same result as 2 g. of tripolyphosphate.

EXAMPLE IX

Four different stuffings were composed as follows:

| Stuffing No. | Beef, percent | Fat, percent | Ratio, meat:fat |
|---|---|---|---|
| I | 65.0 | 13.7 | 4.7:1 |
| II | 55.7 | 25.0 | 2.2:1 |
| III | 52.0 | 30.0 | 1.7:1 |
| IV | 50.7 | 35.0 | 1.4:1 |

To these stuffings were added 1.8% of salt, 0.5% of spices and 0.012% of $NaNO_2$. These mixtures were minced in a known way in the cutter. During this mincing a amount of ice-water was gradually added, as well as mixture of sodium glycinate, glycine and sodium citrate, so that finally 3 g. of such mixture had been worked into 1 kg. of sausage mass. Of the added mixture 52.5% was glycine, 34.5% was Na-glycinate and 13% was Na-citrate 2 aq.

The obtained emulsions ware stuffed into sausage rolls, dried for one hour at a temperature of 55° C., subsequently smoked at this temperature and "cooked" for 75 minutes at a temperature of 78° C. The results were the following:

| Stuffing No.: | Fat separation percent | Jelly-forming percent |
|---|---|---|
| I | 0.15 | 2.3 |
| II | 1.9 | 2.9 |
| III | 3.8 | 2.1 |
| IV | 6.4 | 1.8 |

The same compositions but now without the additive mixture and with the addition of 3 g. of sodium tripolyphosphate per kg. of dry sausage mass, gave the following results:

| Stuffing No.: | Fat separation percent | Jelly-forming percent |
|---|---|---|
| I | 0.18 | 2.5 |
| II | 1.6 | 2.8 |
| III | 4.3 | 1.6 |
| IV | 6.1 | 2.0 |

From this it appears that a full proof sausage additive can be obtained with amino acids.

EXAMPLE X

Using a multi-needle device 200 hams of about 5 kg. each were injected with a solution A and 200 others of the same average weight with a solution B. The solutions were as follows:

A

| | Kg. |
|---|---|
| Water | 1000 |
| Curing salt mixture consisting of 90% salt, 6% nitrite and 4% nitrate | 110 |
| Monosodium glutamate | 1 |
| Mixture of 50 wt. percent Na-glycinate and 50 wt. percent glycine | 23 |

B

| | Kg. |
|---|---|
| Water | 1000 |
| Curing salt mixture consisting of 90% salt, 6% nitrite and 4% nitrate | 110 |
| Monosodium glutamate | 1 |
| Mixture of 75 wt. percent Na-tripolyphosphate, 15% high glassy polymer phosphate and 10% Na-pyrophosphates | 23 |

Both the glycinate and phosphate mixture showed a pH of 9.6 in a 1% aqueous solution. With all injections the amount was such that from the glycinate mixture as well as the phosphate mixture 5 g. was used per kg. meat.

After the injection the meat was kept in a brine solution during one night, then re-injected with A and B respectively, canned and pasteurized until a temperature within the meat of 72° C. was reached. The cans were cooled, opened and the jelly found in the hams was weighed.

The results were as follows:

| Treatment | Quantity of injected liquid remaining in the hams after both injections, in percent | Jelly formation in percent of meat wt. | Colour | Taste | Texture |
|---|---|---|---|---|---|
| Solution A | 76.3 | 4.2 | Very good | Very good | Excellent. |
| Solution B | 74.6 | 5.0 | do | do | Very good. |

The hams were evaluated by a 5-man taste panel. The liquid retained by the hams was firmly bound; they had a solid, homogeneous consistency and could easily be cut without falling apart. Though normally one will not inject such large quantities of liquid the experiment gives a clear demonstration of the water retaining properties of the amino acids according to the invention compared with the phosphates which latter are often used to prevent hams and similar meat cuts from drying out and becoming tough. Especially those amino acids which are building blocks of animal proteins are to be preferred from the point of view of safe and efficient nutrition and excellent performance.

EXAMPLE XI 50 pieces of cod weighing 500 g. each were soaked during 2 minutes in a 10% solution of histidine with a pH of 7.5. 50 similar cod pieces were used as a blank. The cod pieces were cooled and stored during 1 month at −15° C.

Then the fish was gradually brought above the freezing point (0° C.) by storage in a refrigerator.

The fish treated with the amino acid show a quantity of drip water of 3.0±0.9% whereas the blanks had 8±1.9% drip water. Moreover the fish meat with histidine had a firmer texture.

EXAMPLE XII

In the same way as in Example X a comparison was made between the injection of four different solutions A, B, C, D and a blank E:

| Solution: | Percent curing salt mixture | Percent amino acid | Amino acid used | pH of solution |
|---|---|---|---|---|
| A | 20 | 10 | Lysine | 8 |
| B | 20 | 10 | Histidine | 8 |
| C | 20 | 10 | 1-phenyl-alanine | 8 |
| D | 20 | 10 | Methionine | 8 |
| E | 20 | | | 8 |

All solutions were standardized at a pH of 8 by adding either hydrochloric acid or sodium hydroxide, as the case may be.

For each experiment 25 hams of about 5000 g. each were used and injections were made by applying the multi-needle system.

Injection amounted to 10% of the weight of the hams. The further treatment was the same as in Example X.

The hams had a very tender texture and were of outstanding quality.

The evaluation by a 7 member tasting panel gave the following quality sequence starting with the highest quality: B, C, A, D and E far behind.

With A, B, C and D about 80% of the total injected amount remained in the ham, E showed a 26% retention. Colour and texture of A, B, C and D were very good to excellent and no lumps or falling apart occurred on cutting. E showed a somewhat glossy, moist surface, colour and texture fair to good. Jelly formation with A, B, C, D and E was 2.23; 1.68; 2.39; 3.73 and 7.97 respectively.

EXAMPLE XIII

In 1000 g. pieces of beef a solution was injected (multi-needle system) containing 20% curing salt of the same composition as in Example X and in the first case 3% glycine, in the second one 3% glycine+1% lysine and in the third one 3% lysine, the fourth one was a blank with salt only.

All solutions were standardized at pH 9, except No. 4. Injection amounted to 20±0.5 g. per 1000 g. of beef.

Although all solutions showed a very good result the surprising fact was that a taste panel of 7 members evaluated without any exception the taste of the beef with a pure glycine injection as sweet, with pure lysine as different from the blank, whereas with the mixture of glycine and lysine no different taste from the blank beef sample could be detected.

EXAMPLE XIV

It is a great advantage if the additives according to the invention can be applied at a rather low pH. For this reason a standard procedure was set up in which 1% aqueous solutions of 1 g. of the amino acids were made and titrated with 0.1 N hydrochloric acid solution. For comparison it was determined how many ml. of the hydrochloric acid were needed to lower the pH from a value of 7.5 to 5.5 and from 9.5 to 5.5. The results were as follows:

[Buffering value of amino acid solutions]

| Amino acid | Number of ml. of 0.1 or HCl to lower pH from 7.5 to 5.5 | Number of ml. of 0.1 N HCl to lower pH from 9.5 to 5.5 |
|---|---|---|
| Glycine | 4 | 42 |
| Arginine | 4 | 37 |
| Lysine | 4 | 39 |
| Histidine | 56 | 72 |
| Methionine | 3 | 52 |
| Cysteine | 11 | 75 |
| Hydrolized gelatine A | 7 | 44 |
| Hydrolized gelatine B | 6 | 38 |
| Di-iodo-1-tyrosine | 8 | 15 |

In the application of the invention to the treatment of hams and sausages it appeared that histidine, which has the highest buffering value also gave superior results as compared with the other amino acids and this not only in the pH range of 7.5 to 5.5 but also, though to a lesser extent, in the pH range of 9.5 to 5.5.

Gelatine A was obtained by hydrolizing 10 kg. of a commercial gelatine during 1 hour in 100 kg. of 25% HCl under reflux. Gelatine B was obtained by the same procedure with the same quantities but with a 4 hours refluxing period. In both cases the hydrolized product was treated with activated charcoal to remove impurities.

Both products were of a very acceptable quality.

It is clear that the invention also opens the possibility of adding essential amino acids to the daily food package of people or animals. This has the advantage that it can be applied to large population groups without the necessity of putting up separate organizations. The word essential is here used in the meaning of those amino acids that are absolutely necessary as building blocks of the human proteins and are not synthesized in the human digestive tract. Special amino acids may be incorporated in meat to be given to individuals for special nutritional purposes, to older people, etc.

The buffering value of the amino acid solution is for most applications, especially meat, preferably as high as possible keeping in mind that normally not more than 5 g. amino acid per 1000 g. of fresh meat are used. With higher buffering values one may normally use less amino acid for obtaining the same result as with lower buffering values.

Some 3 ml. of 0.1 N mineral acid for lowering the pH from 7.5 to 5.5 is rather low and also 3.5 ml. of this acid to decrease the pH from 9.5 to 5.5 is just acceptable. Preferably more than 10 ml. 0.1 N acid should be needed to reduce the pH value from 7.5 to 5.5 and more than 50 ml. of 0.1 N mineral acid to lower the pH from 9.5 to 5.5, all in a 1% aqueous solution. Very favorable results are obtained when 50 ml. of 0.1 N mineral acid is needed for reducing the pH from 7.5 to 5.5 and more than 70 ml. from 9.5 to 5.5. The reason for this behavior is not fully explainable and certainly not for amino acids which diffuse much more rapidly into fresh meat or sausage masses than any other additive used in the art. In the past favorable results with alkaline substances—and even aqueous sodium hydroxide solution was used—were explained by pointing to the slow diffusion into the meat requiring an excess of alkalinity to reach the total mass of the meat. Some increase of the pH of the meat was needed to obtain an increased juice retention and so it was thought that with a high pH results should be better in view of the greater alkali reserve. With very high pH of 10 and higher and a non-uniform distribution method jelly formation generally increased to such extent that the additives were unacceptable. According to the invention it was proved that with the addition of meat components, in the sense of substances already occurring in the meat, one may obtain surprising results with meat as well as meat products and even at high pH as the rapid diffusion does not create local jelly formations.

As is known many amino acids normally occur in meat such as for instance glycine and lysine and many others. With broken down proteins results are even more surprising as even with a small conversion of some 1% down to free amino acids a favorable result on the quality of meat and meat products was observable. A large part of this result may be due to peptides which are the intermediates in the hydrolysis of proteins to amino acids. The products obtained in this way may be applied in an aqueous solution brought if need be to the required pH of 6 or higher and, when made by enzymatic conversion, preferably after inactivation of the enzymes. One may also remove the water by any known distillation process such as spray drying, freeze drying, drum evaporation, distillation under normal, subnormal or increased pressure or any other method.

With appropriate partly or completely water miscible organic solvents one may also precipitate the amino acids and separate them by filtration, centrifugal action or any other method from the liquid medium.

Pure amino acids such as thyroxine, tryptophan, tyrosine, glycocyamine, norleucine may be separated by standardizing the aqueous solution at a certain pH in the vicinity of 7. In some cases precipitation may be obtained by salting out of the solution with highly soluble substances such as sodium chloride or ammonium sulphate. These methods can be used for pure amino acids as well as the mixtures obtained by hydrolizing animal or vegetable proteins.

The use of complex forming substances for the sequestration of Ca and/or Mg ions improves the results of the amino acids in the sense that in most cases somewhat less amino acid is needed to obtain a certain result. The amount of such reduction is difficult to give in exact figures but can easily be determined experimentally. As an average of a large number of applications the inventor found that generally one could use an amino acid solution in such case which had in 1% aqueous solution a pH of about 0.2 unit less than needed without the complexing agent. Here again the advantage is greater with amino acid solutions having a high buffering capacity.

What is claimed is:

1. In a method for improving qualities including the moisture retention and texture of edible solid animal meat by contacting the meat with a treating composition that has a pH between 6 and 12 when in the form of a 1% aqueous solution, the improvement wherein said composition comprises at least one water soluble monobasic amino acid that has acid buffering power, selected from the group consisting of non-toxic water soluble monobasic amino acids having one carboxyl group in the molecule and salts thereof, in an amount sufficient to improve the moisture retention and texture of said meat.

2. A method according to claim 1, said composition being in the form of an aqueous solution containing about 0.5 to 10% by weight of said amino acid.

3. A method according to claim 1, said amino acids being alpha amino acids.

4. A method according to claim 1, said amino acid having sufficient buffering power that 100 ml. of an aqueous solution thereof containing a 1% weight concentration of total amino acids including salts thereof requires more than 35 ml. of 0.1 N mineral acid to lower the pH from 9.5 to 5.5.

5. A method according to claim 1, said amino acid having sufficient buffering power that 100 ml. of an aqueous solution thereof containing 1% weight concentration of total amino acids including salts thereof requires more than 50 ml. of 0.1 N mineral acid to lower the pH from 9.5 to 5.5.

6. A method according to claim 1, said amino acid comprising an amino acid that occurs as such in the animal body or is a product of hydrolysis of protein molecules occurring in the animal body.

7. A method according to claim 1, in which said composition when in dry state consists essentially of a major proportion of said amino acid and a minor proportion of a substance selected from the group consisting of citric acid, citrates, lactates, tartrates, nitrilo-triacetic acid, ethylene diamine tetra acetic acid, salts thereof, and alkali ortho-, pyro-, meta-, and polyphosphates.

8. A method according to claim 1, said amino acid being contained in a product of the hydrolysis of proteins in which 50–100 wt. percent of the proteins has been broken down to amino acids.

9. A method according to claim 1, said meat being fresh meat and said contacting being effected by injecting into the meat an aqueous solution of said composition having a pH of from 6 to 12.

10. A method according to claim 1, said meat being ham and said contacting being effected by injecting into the ham through an artery thereof an aqueous solution of said composition having a pH of from 6 to 12.

11. A method according to claim 1, said meat being ham and said contacting being effected by injecting into the ham through a multiplicity of hollow needles an aqueous solution of said composition having a pH of from 6 to 12.

12. A method according to claim 1, said meat being fish meat and said contacting being effected by soaking pieces of the fish meat in an aqueous solution of said composition having a pH of from 6 to 12.

13. A method according to claim 1, said meat being cut fresh meat and said contacting being effected by applying to and moistening on surfaces of said meat said composition in a finely divided solid state.

14. A method according to claim 1, said meat being a sausage mass and said contacting being effected by applying said composition in a finely divided solid state to the sausage mass in a cutter.

15. A method according to claim 1, said meat being fresh cut meat and said contacting being effected by injecting into the meat said composition in the form of an aqueous solution containing about 0.5 to 10% by weight of said amino acid together with additional meat curing salts, and having a pH of from 6 to 12, said solution being injected in an amount such that between 0.05 and 2% by dry weight of said amino acid is added to the meat.

16. A method according to claim 15, said solution being injected in an amount such that about 0.3 to 0.5% by dry weight of said amino acid is added to the meat.

17. A method according to claim 1, said amino acid comprising lysine.

18. A method according to claim 1, said amino acid comprising a mixture of glycine and lysine.

19. A method according to claim 1, said amino acid comprising a mixture of glycine and an alkali salt thereof.

References Cited

UNITED STATES PATENTS

| | | | |
|---|---|---|---|
| 3,193,396 | 7/1965 | Sair | 99—222 |
| 2,518,233 | 8/1950 | Hall | 99—140UX |
| 3,010,829 | 11/1961 | Turner | 99—140 |
| 2,912,337 | 11/1959 | Greenberg | 99—107X |
| 3,042,529 | 7/1962 | Radouco-Thomas | 99—107 |
| 3,265,682 | 8/1966 | Gloor et al. | 99—157X |

FOREIGN PATENTS

| | | | |
|---|---|---|---|
| 672,850 | 10/1963 | Canada | 99—110 |
| 607,495 | 10/1960 | Canada | 99—107 |

A. LOUIS MONACELL, Primary Examiner

J. R. HOFFMAN, Assistant Examiner

U.S. Cl. X.R.

99—109, 111, 159